United States Patent
Berstis et al.

(10) Patent No.: US 6,348,877 B1
(45) Date of Patent: Feb. 19, 2002

(54) METHOD AND SYSTEM FOR ALERTING A PILOT TO THE LOCATION OF OTHER AIRCRAFT

(75) Inventors: Viktors Berstis, Austin; Joel Leslie Smith, Round Rock, both of TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/335,294

(22) Filed: Jun. 17, 1999

(51) Int. Cl.[7] ............................................. G01C 21/00
(52) U.S. Cl. ........................ 340/980; 340/961; 345/7; 359/630; 701/301
(58) Field of Search ................... 340/961, 980; 359/630; 345/7, 8; 701/301; 342/357, 457

(56) References Cited

U.S. PATENT DOCUMENTS

| | | | | |
|---|---|---|---|---|
| 4,181,405 A | * | 1/1980 | Cohen | 350/331 |
| 4,914,733 A | * | 4/1990 | Gralnick | 340/961 |
| 4,941,263 A | | 7/1990 | Hirshberg | 340/435 |
| 5,072,218 A | * | 12/1991 | Spero et al. | 340/980 |
| 5,111,400 A | * | 5/1992 | Yoder | 342/455 |
| 5,506,587 A | | 4/1996 | Lans | 342/357 |
| 5,596,332 A | | 1/1997 | Coles et al. | 342/455 |
| 5,798,733 A | | 8/1998 | Ethridge | 342/357 |
| 5,872,526 A | | 2/1999 | Tognazini | 340/961 |
| 6,064,335 A | * | 5/2000 | Eschenbach | 340/961 |
| 6,101,431 A | * | 8/2000 | Niwa et al. | 340/980 |
| 6,215,481 B1 | * | 4/2001 | Tanijiri et al. | 345/207 |

* cited by examiner

Primary Examiner—Brent A. Swarthout
(74) Attorney, Agent, or Firm—Duke W. Yee; Jeffery S. LaBaw; Christopher P. O'Hagan

(57) ABSTRACT

A method of alerting a pilot to the location of other aircraft begins by detecting the presence of at least one other aircraft and then calculating that aircraft's projected flight path in the sky. Given the position of the pilot's head or eyes, a given image (e.g., a circle) is then projected (or otherwise displayed) on the aircraft's windshield at a calculated position. This position represents a relatively small region in the sky that the pilot, given the head or eye position and the projected flight path, should expect to see the other aircraft. In this manner, the pilot need no longer search the sky to attempt to map a display image to an actual location in his or her field of view.

12 Claims, 2 Drawing Sheets

METHOD AND SYSTEM FOR ALERTING A PILOT TO THE LOCATION OF OTHER AIRCRAFT

BACKGROUND OF THE INVENTION

1. Technical Field

This invention relates generally to aircraft detection and, more particularly, to a method and system for assisting an aircraft pilot to readily determine the location of other aircraft in his or her field of view.

2. Description of the Related Art

Aircraft typically include heads-up displays, such as computer monitors and loudspeakers. When a computer monitor or the like is used to present a pilot with information about the position of other aircraft, the pilot must mentally map a display icon on the monitor to the outside world and look for very tiny objects in a large sky. The pilot must then manually scan the sky in an attempt to correlate the icon's location on the monitor with the location of an actual aircraft represented by that icon. During this process, an air traffic controller may also provide audible clues (e.g., "watch for other traffic at 2 o'clock") to assist the pilot. These techniques obviously are quite inefficient, and it is not always a simple matter to translate an aircraft's displayed or suggested position into some actual location in the sky. The problem is exacerbated by the aircraft's own movement, pilot fatigue, weather conditions, and the like.

The present invention addresses this problem.

BRIEF SUMMARY OF THE INVENTION

It is a primary object of this invention to provide a heads-up display technique in an aircraft to assist a pilot in locating other airplanes in the sky. The display technique assists the pilot in quickly locating and seeing other nearby traffic without having to manually search the pilot's field of view.

According to the invention, a method of alerting a pilot to the location of other aircraft begins by detecting the presence of at least one other aircraft and then calculating that aircraft's projected flight path in the sky. Given the position of the pilot's head or eyes, a given image (e.g., a circle) is then projected (or otherwise displayed) on the aircraft's windshield at a calculated position. This position represents a relatively small region in the sky that the pilot, given the head or eye position and the projected flight path, should expect to see the other aircraft. In this manner, the pilot need no longer search the sky to attempt to map a display image to an actual location in his or her field of view.

The image is preferably projected onto the windshield of the aircraft, and various techniques may be used for this purpose. Alternatively, the windshield itself may be fitted with transparent, pixelized liquid crystal elements that can be selectively controlled to render the image. If desired, the image may be rendered in different colors or shapes, and it may include text information identifying the aircraft type or flight number.

The foregoing has outlined some of the more pertinent objects and features of the present invention. These objects should be construed to be merely illustrative of some of the more prominent features and applications of the invention. Many other beneficial results can be obtained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
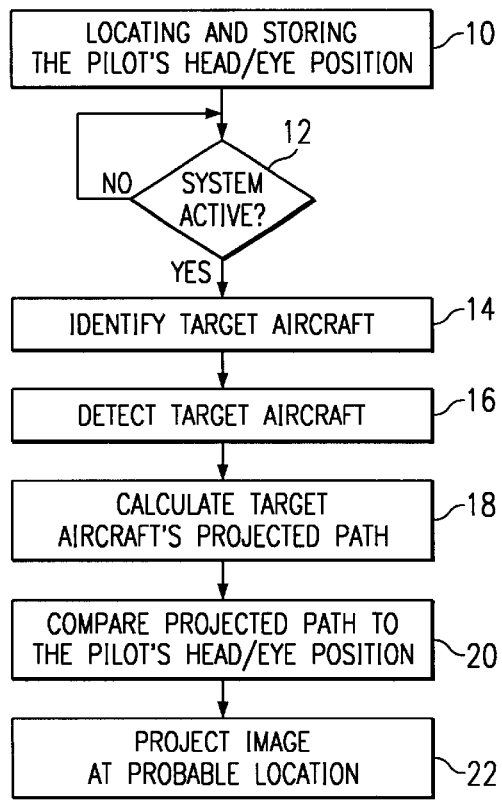
FIG. 1 is a simplified flowchart illustrating the preferred heads-up display technique of the present invention.

FIG. 1 is a flowchart describing the basic display methodology of the present invention, which is operative in an aircraft manned by a pilot. The aircraft typically includes a heads-up display or other computer that normally displays icons or other representations of various aircraft that are flying in the vicinity. In a preferred embodiment, the inventive alert system determines the location of another aircraft in the sky and then projects an image on the aircraft's windshield to direct the pilot's eyes to that image. In this way, the pilot need not search the sky, or some portion thereof, to quickly locate the other aircraft.

Generally, the method begins by locating and storing the pilot's head and/or eye position relative to the aircraft windshield. This calibration is step 10, and it may be performed at any time (e.g., before the aircraft takes off or during flight). At step 12, a test is run to determine whether the inventive alert system has been activated to locate a given aircraft. If not, the routine cycles. If the system has been activated, the routine continues at step 14 to identify a given aircraft to be located. Step 14 typically involves having the pilot identify a given icon on the heads-up display (or other monitor device) and requesting display of an image finder on the windshield to assist the pilot in locating the aircraft corresponding to that icon. Of course, step 14 may be implemented in an automatic manner (e.g., by displaying any aircraft within a given distance ahead of the plane) if desired. At step 16, the system detects the presence of the other aircraft. As will be described, one particularly advantageous technique for accomplishing this detection is through a time-multiplexed GPS-based cell location beacon system, which makes use of GPS receivers for determining the location of a given vehicle within an airspace. A representative system of this type is described in a related application, Ser. No. 09/239,335, filed Jan. 28, 1998, Attorney Docket No. AT9-98-870, titled Time Multiplexed Global Positioning System Cell Location Beacon System and assigned to the assignee of this invention. That application is incorporated by reference.

The present invention, however, is not limited to use with such a system. Thus, for example, the relevant positioning information may be obtained from any convenient source (e.g., air traffic control tower), or the other aircraft may transmit other types of signals from which their position may be established.

Returning back to the flowchart, the inventive display routine then continues at step 18 to use the detected location of the other aircraft to calculate a projected path of the aircraft (relative to the pilot's position in the sky). At step 20, the routine compares the projected path of the other aircraft to the position of the pilot's head or eyes. As described above, the pilot's head or eye position was obtained during the calibration step. If desired, the actual head or eye position may be recalculated on-the-fly and compared to the previously-recorded position information to ensure that the pilot has not moved materially from the calibrated position. As a result of the comparison in step 20, the routine determines a probable area in which the other aircraft may be visible to the pilot, given the pilot's current head or eye position. At step 22, an image is projected against the windshield at that location. The image, for example, is a polygon or circle in which the other aircraft should be visible to the pilot. This display technique enables the pilot to locate the aircraft without having to manually search the sky.

One of ordinary skill in the art will appreciate that the physical configuration of the windshield, e.g., its degree of curvature, may impact the calibration as well as the projection of the image on the windshield. To compensate, the computer program includes data describing the actual shape of the windshield in three space. From this data, the program can calculate the windshield's curvature at a given point or region and apply appropriate correction signals to adjust the displayed image appropriately.

Figure 2:
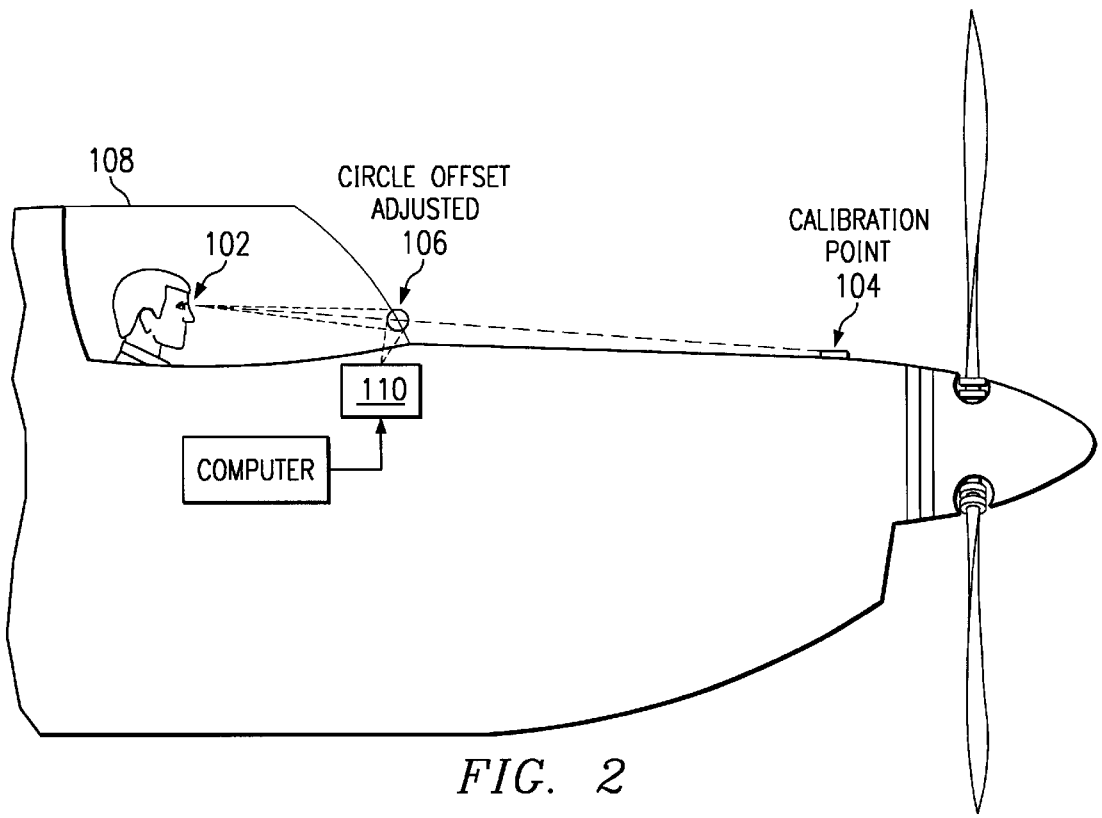
FIG. 2 is a pictorial representation of an aircraft cockpit illustrating how the display is calibrated to identify a pilot's head/eye position.

Referring now to FIG. 2, a simplified illustration is shown of one preferred technique for calibrating the pilot's head and/or eye position. A pilot, seated in the cockpit of an aircraft, observes a calibration point 104 external to the cockpit. The calibration point may be located on a portion of the aircraft itself or may be located near the aircraft when the aircraft is stationary on the ground. For example, the calibration point may be an air vent, a propeller (in a propeller-driven aircraft), an engine part, or some other physical marker located on the surface of the aircraft. Alternatively, the calibration point is a light beacon or insignia painted onto the surface of the aircraft. If the observation point 104 is located near the aircraft when the aircraft is stationary, the calibration point may be a test equipment device, beacon or other marker maintained at a predetermined relative position with respect to the aircraft. The pilot sits in the cockpit of the aircraft in a normal position for flying the aircraft. While the pilot observes the calibration point 104 through the windshield 108, a heads-up display projector 110 (as will be described in more detail below) illuminates a projection point 106 on the windshield 108.

The projection point 106 is described as a single point, however, it will be apparent that the projection point 106 may be replaced with a collection of projection points situated within a small distance from one another and collectively representing an icon, circle, geometric pattern, or other image, that is projected onto the windshield 108. In one embodiment, the heads-up display projector 110 is a laser mounted within the cockpit of the aircraft that illuminates a small mirror mounted on a coiled actuator. The coiled actuator has a small spring that is electronically controlled to redirect a beam of light from the laser onto the projection point 106. The actuator may be controlled to oscillate such that the directed beam of light forms a small circle around the projection point 106 on the windshield 108. In another embodiment, a Fresnel lens is used to project light onto the windshield 108 to create an image (in two dimensions) at the projection point 106. This projection mechanism is also used later to display an image through which the pilot may view a target aircraft, as will be seen.

Seated in a comfortable flying position within the cockpit of the aircraft, the pilot manipulates a control device that moves the location on the windshield 108 on which the heads-up display projector 110 illuminates the projection point 106. In other words, the pilot moves the projection point 106 onto any desired location on the windshield 108, using the control device, which may be a simple joystick. Other control devices include voice- or other touch-activated devices or systems. The pilot then moves the projection point 106 until the calibration point 104 is obscured by the projection point. In one embodiment, the heads-up display projector 110 then creates a small circle apparently enclosing the calibration point 104. In another embodiment, the heads-up display projector 110 then creates an icon or other image obstructing the pilot's view of the calibration point 104.

Using a similar method for other calibration points 104 external to the cockpit of the aircraft, the pilot "trains" the system to calculate the pilot's observation position 102. Generalizing, the pilot's observation position 102 is the approximate location of the pilot's head and/or eyes within the cockpit when the pilot is seated in the comfortable flying position.

Calibration of the system to determine the location of the pilot's eyes may be performed by other means. Thus, for example, a pair of transducers may be used to transmit a high frequency locating signal to determine the pilot's head position. This type of detection scheme is described in U.S. Pat. No. 5,588,063 to Edgar, which is incorporated herein by reference. In another alternative, an adjustment marker located at a known position in the cockpit is dropped down in front of the pilot. The pilot may then use this marker and adjust an image on a cockpit on-screen display. The resulting signaling is then used to determine the position of the pilot's head and eyes relative to the adjustment marker and thus the absolute position relative to the windshield. Another variation is for the pilot to shine a laser pointer or the like at a spinning propeller. A marker may then be adjusted relative to the reflected beam to establish a position of the pilot's eyes. Still another technique is to simply measure the pilot, calculate his or her height in the seated position, and then determine where the pilot's eyes are relative to the windshield.

Regardless of the technique used, typically the calibration step need not be repeated for the pilot. Rather, the pilot's head and/or eye position is simply recorded for future use. Having calibrated the alert system to the pilot's expected head/eye position, the pilot may then use the system during an actual flight to identify the expected location of a given target aircraft relative to the pilot's line of sight. As described in copending application Ser. No. 09/239,335, in the time multiplexed GPS-based cell location beacon system, each participating aircraft operating in the airspace has a GPS system and a receiver for listening for signals from other participating aircraft in the surrounding airspace. Each of the aircraft transmits location messages derived from its GPS position signals.

Figure 3:
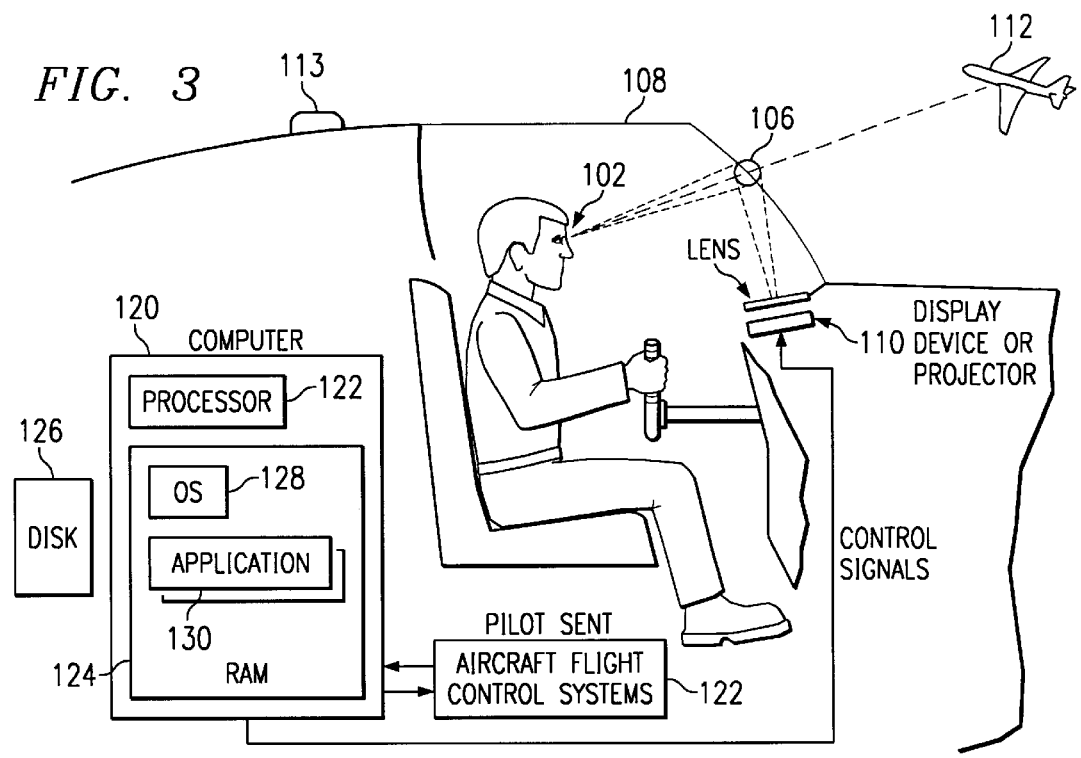
FIG. 3 is a pictorial representation of the aircraft cockpit illustrating the inventive heads-up display technique.

Referring now to FIG. 3, when the aircraft is airborne, the alert system is configured to receive beacon signals from other aircraft via antenna 113. The beacon signals contain position information in an X Y Z coordinate system representing longitude, latitude, and altitude. In an alternative embodiment, various sensors are located at various positions along the surface of the aircraft to detect beacon signals from other aircraft and, by comparing signal strength and phase information among the receivers, to determine a bearing to whatever aircraft has transmitted the beacon signal.

Beacon signal information received from a nearby aircraft is provided to a computer 120. The computer 120 comprises a processor 122, system memory 124, disk storage 126, an operating system 128, and one or more application programs 130 for effecting given control function of the present invention. The computer 120 is also configured to receive guidance information from the flight control systems 122 of the aircraft. As is well-known, the local guidance information contains not only the longitude, latitude and altitude of the aircraft, but also heading information representing the direction in which the aircraft itself is moving. By combining the guidance information with other information derived from the received beacon signals, the computer 120 identifies bearing information for each received beacon signal. The bearing information represents a vector between the aircraft on which the alert system is operating to a target aircraft that generated the beacon signal. The computer then converts the bearing information into a location on the windshield 108. As described above, the location on the windshield 108 is selected to represent where the pilot, given his or her observation position 102, should be able to view the aircraft transmitting the beacon signal.

The computer 120 controls the heads-up display projector 110 to illustrate the aircraft generating the beacon signal by creating an image 106 on the windshield 108. The image may be a circle (or other geometric shape) surrounding a projection point and identifying the location on the windshield 108 through which the pilot should look to view whatever aircraft is transmitting the beacon signal. The displayed representation may also include textual or graphic information identifying various characteristics of whatever aircraft generated the beacon signal.

For example, the icon may be of a particular color or size in accordance, for example, with the danger associated with the proximity of the other aircraft. The processor may cause a larger image or an image of a particular color when a beacon signal is received from a target aircraft that poses a danger due to its proximity, bearing or other characteristic. The image may be varied to represent the type of aircraft generated the beacon signal. Alternately, the image characteristics or size may be selected to represent the distance to such other aircraft, closing speed of such other aircraft, or angle of approach with respect to such other aircraft. Indeed, one of ordinary skill will appreciate that any information conveyed by the beacon signal may be used by the processor to select the image or its characteristics.

Thus, when a pilot is flying the aircraft in busy airspace, he or she is able to readily identify the locations of other aircraft by directly viewing the windshield image(s) or indicators. In this way, even small, distant aircraft that otherwise would be difficult to notice or locate with precision by the naked eye are viewed with little effort.

FIG. 3 also shows the relationship between the pilot's observation position 102 and the heads-up display projector 110 in greater detail. The pilot is seated in the aircraft and observes the surrounding environment through the windshield 108 of the aircraft. The pilot's eyes are directed to a particular point on the windshield for observing a distant aircraft 112 located by the beacon system. Because the aircraft 112 is located at such a great distance from the pilot, the aircraft 112 itself appears very small from the pilot's location. Consequently, if the pilot looks through the windshield at the distant aircraft 112, looks away, and then attempts to find the distant aircraft 112 again, the pilot may require several seconds to find the distant aircraft 112, even with a general recollection of where the aircraft 112 had been. The described embodiment of the present invention draws the pilot's attention to the area of the windshield through which the pilot should look to observe the distant aircraft 112, thereby reducing search time. Moreover, if several distant aircraft are detected by the beacon system, the pilot uses the alert system of the present invention to associate given location information with the appropriate aircraft.

Figure 4:
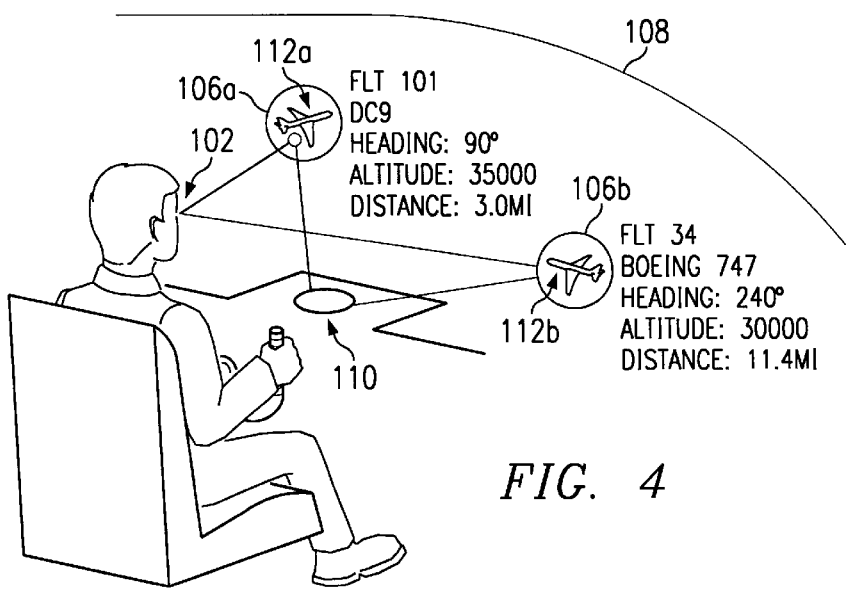
FIG. 4 is a pictorial representation of the in aircraft windshield illustrating the projection of an aircraft finder according to the invention.

FIG. 4 illustrates a view of the image projected on the windshield from behind the pilot. In this illustration, there are two aircraft 112a and 112b located in front of the aircraft. As shown in FIG. 4, a circle 106a (e.g., formed by modulating a projection point) draws the pilot's attention to aircraft 112a, while circle 106b draws the pilot's attention to aircraft 112b. Additional information identifying the airplane type, flight number, heading, altitude and distance, may also be displayed or projected. Alternatively, such information may be output in an audible manner. As can be seen, in the preferred embodiment, each aircraft 112a and 112b appears to be surrounded by a circle and (optionally) to be accompanied by textual information. As noted above, the circle may be in one or more colors, such that the particular color used indicates some given characteristic of the target aircraft, e.g., its range, speed, course, or the like.

Of course, one of ordinary skill will appreciate that the inventive display technique may also be used to provide a collision avoidance interface. For example, a small green circle apparently surrounding a distant aircraft, accompanied by textual information in a normal font having a font size ½ inch in height may indicate a given distance (e.g., more than 3 miles). A somewhat larger yellow square apparently surrounding a closer aircraft and accompanied by somewhat larger text in a different font style may a closer distance (e.g., between 2–3 miles). Any aircraft located between 1–2 miles would be identified by an image projected in a red octagon, for example, will larger text and perhaps in a flashing manner. The display images change dynamically as the aircraft move relative to each other.

Of course, the particular image (e.g., circle, square, icon, etc) is not limited. The projected image may be stationary on the windshield, or it may appear to blink or move slightly, to draw the pilot's attention to the aircraft. Other variations and display techniques, such as alternating between a different colors or sizes, rotating the images about the aircraft, or alternating between several different geometric shapes, may be implemented as well.

One of ordinary skill will further appreciate that the image can be placed on the windshield without using a discrete projector. Thus, in an alternate embodiment, the windshield 108 (or some portion thereof) includes an array of transparent pixelized liquid crystal elements, each controlled by a set of conductive leads. In such case, the projector need not be used, and the aircraft finder images are created on the display by the computer, which applies appropriate control signals through display drivers. In this embodiment, a video graphics device identifies a pair of coordinate locations with each possible projection point 106 on the windshield 108. By applying a predetermined voltage to a particular location on the windshield 108, the video graphics device is able to create an image on the windshield 108 of the aircraft.

As mentioned above, the system may also be used to store pilot observation position 102 information within a data record. The pilot's observation position 102 may then be retrieved, and thus calibration is not required. When the pilot moves to another airplane (i.e. a plane with the same ergonomics), the data record is simply input into to the computer. As noted above, a preferred aircraft detection system for use in this invention is a GPS based cell location beacon system. Although the particular details of such system are beyond the scope of the present invention, generally, such a system operates as follows. The airspace is divided into a hierarchically organized set of cells. Given portions of cells are afforded time slices in a repeating unit of time exactly specified by a GPS clock. Each aircraft has a transmitter capable of transmitting a beacon message. The message comprises data, such as aircraft ID and type, position (as longitude, latitude and altitude), heading (as pitch, yaw, and roll), speed, frequency to which an audio receiver of the vehicle is tuned, and a checksum for error correction. Each transmitter is assigned an allotted time slice. When a given aircraft's time slice is reached, the message is broadcast.

As described generally above, an aircraft receives beacon messages of this type from one or more other aircraft that are provisioned to include this location system. The control routines running in the on-board computer receive such data and, as noted above, are used to calculate the projected flight path of one or more target aircraft, to compare this flight path with pilot position (head/eye) information, and to generate signals for driving the projector or windshield display drivers. Of course, the information presented on the windshield may move over time as the two aircraft move relative to each other. Moreover, as noted above, if the calculated flight path is closer than some recommended distance, an alarm can be presented recommending a course of action. The alarm can take the form of highlighting a portion of the projected paths in a prominent color, e.g., red, or causing the flight paths to blink. Audio signals are also possible.

As described above, the preferred embodiments of the invention are a system programmed to execute the method or methods described herein, the methods themselves and a computer program product. The sets of instructions which comprise the computer program product are resident in a random access memory of one or more systems as described generally above during execution. Until execution, the sets of instructions can be stored in another type of memory such as flash memory, hard disk or CD-ROM memory. Furthermore, the sets of instructions can be stored in the memory of another computer and transmitted to the system when desired by a wired or wireless network transmission medium. The physical storage or transmission of the sets of instructions change the medium in which they are resident. The change may be electrical, magnetic, chemical or some other physical change.

While the present invention, its features and advantages have been described with reference to certain illustrative embodiments, those skilled in the art would understand that various modifications, substitutions and alterations can be made without departing from the scope and spirit of the invention. Therefore, the invention should be not construed as being narrower than the appended claims.

Other variants are within the scope of the present invention. Thus, for example, the computer may be further programmed to receive additional information about the pilot's position and use such information to drive the projector or windshield display. For example, if a pilot adjusts the seat in which he or she is sitting, or if the pilot manipulates the flight controls of the aircraft in a way that suggests the pilot is leaning forward or to either side, or if the processor detects that the aircraft is maneuvering in a manner that would ordinarily be expected to cause the pilot to lean to one side or the other, the position of the projection point on the windshield may be further adjusted to compensate for the then-current position of the pilot.

As another variation, the pilot may be alerted to the location of a target aircraft by outputting the given image on a head-mounted display associated with the computer. This image may be used in lieu of, or together with, the windshield display (as described above) generated by the projector to assist the pilot in locating the target.

For more display precision, it may be desirable to incorporate an accelerometer or other such device, e.g., in the pilot's helmet, to identify any large movement of the pilot's head. The output signals from the accelerometer may then be used to adjust the image signals output on the windshield to accommodate such large variations in the pilot's expected head position.

Having thus described my invention, what we claim as new and desire to secure by letters patent is set forth in the following claims:

What is claimed is:

1. A method, operative in an aircraft having a windshield, for alerting a pilot to the location in the sky of a target aircraft, comprising the steps of:
   determining a position of a pilot's eyes within the aircraft, comprising the steps of:
   comparing a sensed position with a calibrated position; and
   generating a calculation of the position of the pilot relative to the windshield;
   determining a position of the target aircraft; and
   based on the position determinations, outputting a given image on the windshield at a calculated position to indicate the target aircraft's presence in the sky.

2. The method as described in claim 1, wherein the given image is a circle.

3. The method as described in claim 1, wherein the given image is generated by modulating a point source.

4. The method as described in claim 1, wherein the image includes indicia identifying the target airplane.

5. The method as described in claim 1, wherein the image includes indicia identifying the target airplane's identity.

6. The method as described in claim 1, further including the step of altering the image as the aircraft and the target aircraft move relative to each other.

7. A method for alerting a pilot to the presence and location of other aircraft in the sky, comprising the steps of:
   detecting the presence of one or more other aircraft in the sky;
   for each aircraft detected, calculating a projected flight path;
   determining a position of a pilot's eyes, comprising the steps of:
   having the pilot locate a reference point on the aircraft;
   adjusting a position of a reference image relative to a fixed point; and
   generating a position signal indicative of the position of the pilot's eyes relative to the windshield; and
   based upon the calculated projected flight path and the position determination, displaying an image on an aircraft windshield at a calculated position to indicate the detected aircraft's presence in the sky.

8. The method as described in claim 7, wherein the step of displaying an image includes:
   projecting a point source at a given location; and
   modulating the point source to generate the image.

9. The method as described in claim 7, wherein the step of displaying an image includes:
   activating given display elements located in an array of display elements associated with the windshield.

10. The method as described in claim 7, wherein the image includes information selected from the set of information consisting essentially of aircraft type, aircraft identity, heading, altitude, and speed.

11. A method for alerting a pilot to the presence and location of other aircraft in the sky, comprising the steps of:

prior to flight, determining an expected position of a pilot's eyes;

during flight, detecting the presence of a target aircraft;

calculating a projected flight path of the target aircraft;

during flight, determining a current position of the pilot's eyes by comparing a sensed position with the expected position; and based upon the calculated projected flight path and the current position determination, displaying an image on an aircraft windshield at a calculated position to indicate the target aircraft's presence in the sky.

12. The method as described in claim 11 wherein the step of determining the expected position of the pilot's eyes includes:

having the pilot locate a reference point on the aircraft;

adjusting a position of a reference image relative to a fixed point; and generating a position signal indicative of the position of the pilot's eyes relative to the windshield.

* * * * *

UNITED STATES PATENT AND TRADEMARK OFFICE
CERTIFICATE OF CORRECTION

PATENT NO.   : 6,348,877 B1
DATED        : February 19, 2002
INVENTOR(S)  : Berstis et al.

It is certified that error appears in the above-identified patent and that said Letters Patent is hereby corrected as shown below:

<u>Title page,</u>
Item [74], *Attorney, Agent, or Firm* — please delete "Jeffery" and insert -- Jeffrey --.

<u>Column 2,</u>
Line 14, after "the", please delete "in".

<u>Column 8,</u>
Line 12, after "what", please delete "we" and insert -- I --.

Signed and Sealed this

Third Day of December, 2002

JAMES E. ROGAN
*Director of the United States Patent and Trademark Office*